United States Patent [19]

Bachman

[11] 4,068,299
[45] Jan. 10, 1978

[54] DATA PROCESSING SYSTEM INCORPORATING A LOGICAL COMPARE INSTRUCTION

[75] Inventor: Charles W. Bachman, Lexington, Mass.

[73] Assignee: Honeywell Information Systems, Inc., Phoenix, Ariz.

[21] Appl. No.: 424,406

[22] Filed: Dec. 13, 1973

[51] Int. Cl.² .............................................. G06F 3/00
[52] U.S. Cl. .................................................... 364/200
[58] Field of Search .................... 340/172.5, 347 DD; 364/900, 200; 444/1

[56] References Cited

U.S. PATENT DOCUMENTS

3,680,058  7/1972  DeSantis et al. ................... 340/172.5
3,805,247  4/1974  Zucker et al. ..................... 340/172.5

Primary Examiner—Leo H. Boudreau
Attorney, Agent, or Firm—William W. Holloway, Jr.; Ronald T. Reiling; Nicholas Prasinos

[57] ABSTRACT

An apparatus for utilizing a logical compare instruction is disclosed. The apparatus develops a data field descriptor associated with and describing the attributes of each of the operands of the compare instruction. If the operands have different formats, when matching the contents of a first operand to the contents of a second operand, one operand is converted at execution time of the compare instruction to a format consistent with the other operand. The apparatus determines whether the contents of the first operand is greater than, less than, or equal to the second operand.

13 Claims, 6 Drawing Figures

Fig. 1a.

| OP CODE | MBZ | ADDRESS SYLLABLE (AS1) |
|---|---|---|
| 0    7 | 8  11 | 12                              31 |

| GR1 | GR2 | MBZ | ADDRESS SYLLABLE (AS2) |
|---|---|---|---|
| 32  35 | 36  39 | 40  43 | 44                           63 |

—100

DATA FIELD DESCRIPTOR

Fig. 1c.

| TAG | DRN | STE | STN | DISPLACEMENT |
|---|---|---|---|---|
| 0  1 | 2  3 | 4    7 | 8        15 | 16                        31 |

—102

| BIT FIELD | MBZ | ARRAY | A1 | DATA TYPE | KEY | LENGTH |
|---|---|---|---|---|---|---|
| 32  34 | | 36  38 | 39 | 40      47 | 48    55 | 56      63 |

—104

| LENGTH | SIZE |
|---|---|
| 64                        79 | 80                          95 |

DATA PROCESSING SYSTEM INCORPORATING A LOGICAL COMPARE INSTRUCTION

BACKGROUND OF THE INVENTION

Related Applications

1. "Address Development Technique Utilizing a Content Addressable Memory", invented by James L. Brown and Richard P. Wilder, Jr., filed on Aug. 24, 1972, having Ser. No. 283,617 and assigned to the same assignee as the instant invention, now U.S. Pat. No. 3,800,286.
2. "Segment Address Development", invented by Bienvenu and filed on May 16, 1974, having Ser. No. 470,496 and assigned to the same assignee as the instant invention.
3. "Data Processing System Utilizing Data Field Descriptors for Processing Data Files", invented by Charles W. Bachman, filed on Dec. 13, 1973, having Ser. No. 424,259 and assigned to the same assignee as the instant invention.
4. "Data Processing System Incorporating a Logical Move Instruction", invented by Charles W. Bachman, filed on Dec. 13, 1973 having Ser. No. 424,381 and assigned to the same assignee as the instant invention, now U.S. Pat. No. 3,936,804.
5. "Data Processing System Utilizing a Hash Instruction for Record Identification", invented by Charles W. Bachman, filed on Dec. 13, 1973 having Ser. No. 424,391 and assigned to the same assignee as the instant invention.

Field of the Invention

This invention relates generally to data processing systems and more particularly to an apparatus for comparing the contents of two distinct data fields.

Description of the Prior Art

Because of the continuous advances made in multiprogramming and shared access data processing systems, new programs are constantly being written which place different requirements on existing files. In the past to alter or restructure a file, renovation of the entire file had to be undertaken. In order to alleviate this problem, the concept of data independence has been utilized. In description controlled files, i.e., files where the description of the contents and structure of the data is carried separately from the program, data independence allows one form of the data to be changed without requiring a concomitant change of the other form.

Thus, data independence, as implemented in the current state of the art requires the concept of two forms of data representation, first, the form of the data field seen by the program and, second, the form of the data field on secondary storage. This requirement, however, makes the task of deblocking and enblocking data many times more burdensome to those routines operating with data base files. It has been shown that a substantial amount of data processing time is used in first deciding the type of instructions required to deblock or enblock data and second the selection of the specific instructions to execute the operation. Moreover, to employ the variety of instructions required for this task costs so much in memory space requirements and data processing time that a major performance problem in the data processing system exists.

When viewing the overall performance criteria as applied to specific instructions, limitations in the data processing system may provide for degradation of the data processor's performance. For example, when a user writes his data, he may do so using a variety of formats. If the user desires to compare discrete portions of his data fields, it would appear that a simple compare instruction would suffice. However, the data processing unit may have taken the data field in question and because of a decision by the data administrator lengthened the data field to meet its general format. This may occur for example when a user has a small firm of only 100 employees, but the data processing system has a plurality of users who have larger work forces. As a result, the user only requires 4 bytes to identify his employees whereas the data processing unit will have 6 bytes for identification of employees. When executing a compare instruction, the data processor must first determine the user's length via a subroutine which accesses memory and then generate the specific instructions which will perform the comparison. As is apparent, considerable storage space and execution time is required for this simplified operation.

Another area where compare instructions undergo significant alteration involves the situation where the units of the data processor have one measurement and the user has written his program in another measurement. For example, if the data processing system has information in grams and the user writes his program in pounds, the comparison operation requires several subroutines to determine the type of conversion required and then to select the specific instruction to perform the operation. These subroutines are not only wasteful of computer time but the plurality of instructions required do not optimize the data processor's memory space.

The present disclosure is directed to a system which eliminates the dual task of determining the type of operation necessary and the selection of the instructions to perform the operation for the execution of a compare instruction. This is accomplished by a compare instruction which has the ability to compare two fields of different types through descriptors in one instruction. Thus, if a 4 byte field were to be compared to a 6 byte field or grams were to be compared to pounds, the instruction itself would at execution time utilize the necessary information needed to carry out the comparison.

In the related application (No. 3) to Charles W. Bachman incorporated fully herein, data field descriptors describing the attributes of the various data fields are enumerated. By utilizing these data field descriptors, the systems transforms the compare instruction into a general purpose logical instruction which allows the system to operate on a plurality of various data types. It accomplishes this feature by incorporating data field descriptors into its control mechanism such that at the time of execution of the instruction reformatting of the data to appropriate units occurs. Thus, prior to execution time, a general procedure has been followed which requires no specialized instructions as needed in the prior art. Moreover, no specialized subroutines are required which are wasteful of data processing time since the data attributes in conjunction with the compare instruction allow comparison of different data formats. This solution provides further embellishments in that alteration of records in a field or restructuring of records in a file is easily accomplished. Since the system incorporating this instruction is not dependent upon the information as defined by the user or by the data processing system, any alteration or change is easily resolved.

OBJECTS OF THE INVENTION

It is an object of this invention to provide an improved data processing system which is able to operate with a variety of data types from a plurality of users.

It is another object of this invention to provide a compare instruction in a data processing system which significantly increases the operational performance of the overall system.

It is a further object of this invention to provide a data processing system which can quickly and efficiently execute the logical compare instruction for all data types.

It is a yet another object of this invention to eliminate the requirements of special subroutines to determine the type of instruction required and select appropriate specific instructions for operating on a variety of data types.

SUMMARY OF THE INVENTION

The foregoing objects are achieved according to one embodiment of the invention and according to one mode of operation thereof, by providing in a data processing system a compare instruction which locates both data fields to be compared and data field descriptors associated with and describing the attributes of each data field. The data attributes are developed by indirection of an address syllable within the compare instruction which specifies the data field descriptors. After the data fields have been determined, the compare instruction under control of a control store unit and a control interface adapter unit provides for the automatic reformatting of one data field to meet the format of the other data field. Subsequently, a bit by bit comparison of the two data fields is made. A determination of whether the first data field is greater than, less than, or equal to the second data field is then provided.

BRIEF DESCRIPTION OF THE DRAWINGS

The novel features which are characteristic of this invention are set forth with particularity in the appended claims. The invention itself, however, both as to its organization and operation together with further objects and advantages thereof may be best understood by reference to the following description taken in connection with the accompanying drawings in which:

DETAILED DESCRIPTION OF THE PREFERRED EMBODIMENT

Since the present invention pertains to data processing systems, the description thereof can become very complex. However, it is believed unnecessary to describe all the details of a data processing system to completely describe the present invention. Therefore, most of the details that are well known in the art will be omitted from this description. Even though details are eliminated, a basic description will be given of the entire system to enable one skilled in the art to understand the environment which the present invention is placed. Moreover, the same reference numerals have been used to designate corresponding elements throughout the respective use of the drawings where possible thereby facilitating a great understanding of the relationships therebetween.

Figure 1A:
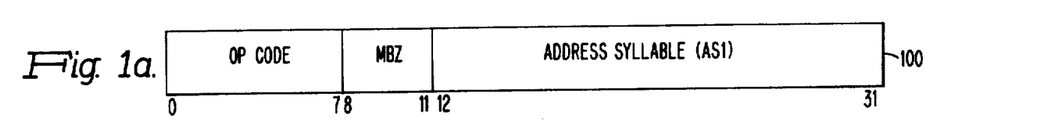
FIGS. 1a-1c are schematic diagrams of various hardware structures utilized in the present invention.
Figure 1B:
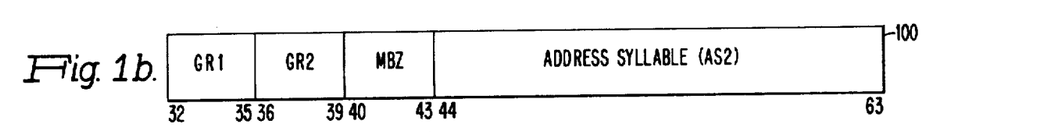
Figure 1C:
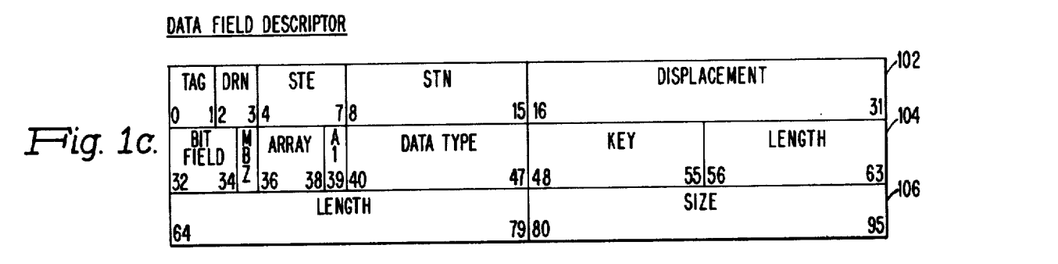

In FIG. 1 the words which provide for the implementation of the compare instruction of the present invention are illustrated. More specifically, FIG. 1a shows the first half of compare instruction 100 utilized in the present invention. In FIG. 1a, the first eight bits specify an operation code, i.e., OP code, that has a particular bit designation which, when decoded, identifies the compare instruction. The next 4 bits, bits 8–11 are shown as MBZ which indicates these bits must be zero. Bits 12–31 identify the first address syllable (AS1) which is a logical representation of the source field operand in memory.

For the particular type of operation utilized herein the address syllable has its first bit, i.e., bit 12 set to binary ONE. This bit is utilized to specify the indirect addressing mode which first accesses a data field descriptor as shown in FIGS. 1c via the mechanism cited in co-pending application to Charles W. Bachman for Data Processing System Utilizing Data Field Descriptors for Data Base Files. Subsequently, word 102 of the data field descriptor accesses the data field desired. The retrieval and development of the data field and data field descriptors for each address syllable will not be explained herein since a comprehensive description has been made in the above application.

For the compare instruction, two address syllables are required since the attributes of the source and the destination must be known. Thus, the first address syllable, AS1, i.e., bits 12–31, specifies the logical operand of the source as provided by the user and brought into a memory location; and the second address syllable, AS2, i.e., bits 44–63, specifies the logical operand of the destination.

Each address syllable AS1 and AS2 for a compare instruction references a data field descriptor as shown in FIG. 1c as words 102, 104 and 106. The word 102 eventually is stored in the general registers designated in FIG. 1b as bits 32–39. Bits 32–35 designate a first general register corresponding to the first address syllable; bits 36–39 designate a second general register which holds the information developed by the second address syllable. The second address syllable is shown as bits 44–63 which like address syllable AS1 develops by indirection words 102, 104 and 106 shown in FIG. 1.

Words 104 and 106 are an extended data descriptor which contains attributes particularized to the data. After word 102 has been accessed, the tag field 01 indicates that additional data is to be retrieved. This additional data (i.e., at least word 104) describes the attributes of the operand to be fetched by the development of word 102.

More specifically, in word 104, bits 32–34 identify a bit string which offers the user the capability of compacting information on his files in the form of bit strings. Bit 35 must be zero. Bits 36–38 specify an array field which defines array control of the operand. By array control is meant that more than one operand is located in the data field pointed to by the address syllable. If the value of bit 36 is a binary ONE, word 106 having a length and size field is accessed in order to determine the location of the particular operand and its size in the array field.

Bit 39 of the word 104 specifies an alterability indicator. If the alterability indicator is present, i.e., if the bit is a binary ONE, the operand in the source field as described by the data field descriptors may be written into the operand pointed to by the destination.

Bits 40–63 of word 104 specify the data field descriptors identifying characteristics of the data. More specifically, bits 40–47 specify the data type. By data type is meant a description of certain features of the format of information as provided from a user. For example, a binary code of a certain value could indicate alphanumeric string; unpacked decimal; packed decimal; and other various formats of information. For purposes of the compare instruction, three groups will be distinguished. The first group is the alphanumeric string format whereby field-to-field comparisons are made. The second group includes unpacked and packed decimals which are changed to a packed decimal configuration if either is present; the third group concerns additional formats which must be translated and are not considered herein.

Bits 48–55 define the key field of the operand. The key field is a description of certain features for a particular data type, i.e., a description of the form of information which the user has provided. As a result, the key field provides a secondary imposition of requirements on the data type. For example, if pounds per square feet were to be moved from a source field to pounds in a destination field, the key field would indicate that such an operation was not allowable. Thus, even if data types are compatible, some conversion must be utilized with unequal key fields.

Bits 56–63 of word 104 are an 8 bit length description of the operand pointed to by the address syllable. The length description indicates the number of bytes in the operand. The operand's length must meet the following conditions: first, for a byte string, the length must be less than or equal to 256 bytes; second, for a decimal string, the length must be less than 32 digits. If the length exceeds these limits, an illegal data exception results.

FIG. 1c shows word 106 containing bits 64–79 specifying a length indication and bits 80–95 specifying a size indication. Each of these is used when the array bound index of bits 36–39 of word 104 are present. A detailed explanation of these fields is given in the Charles W. Bachman patent application previously cited on page 9. The mechanism provided by word 106 to obtain the data is not part of this invention and hence not explained herein.

Figure 2:
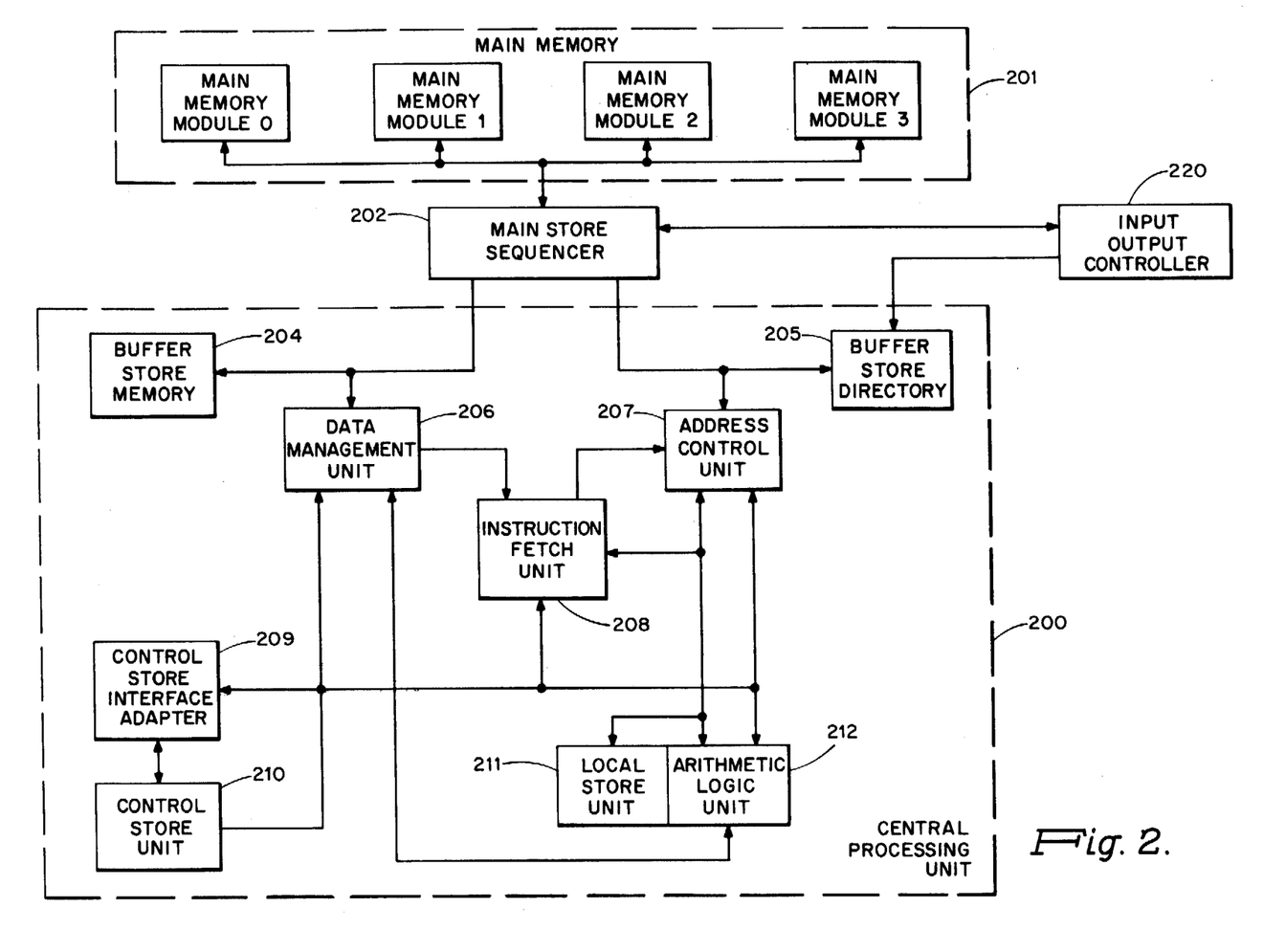
FIG. 2 is a general block diagram of a data processing system embodying the present invention.

The explanation of the operation of the instruction 100 as shown in FIGS. 1a and 1b and the data field descriptors resulting from the address provided by instruction 100 as shown in FIG. 1c will be better understood when viewing the block diagram of FIG. 2 which shows a data processing hardware system which utilizes the invention.

Referring to FIG. 2, a main memory 201, is comprised of four modules of metal-oxide semiconductor (MOS) memory. The four memory modules 0–3 are interfaced to the central processor unit 200 via the main store sequencer 202. The four main memory modules 0–3 are also interfaced to the peripheral subsystem such as magnetic tape units and disk drive units (not shown) via the main store sequencer 202 and the input/output controller, IOC 220. The main store sequencer gives the capability of providing access to and control of all four memory modules. Because the memory store sequencer 202 can overlap memory cycle requests, more than one memory module 0–3 may be cycling at any given time. The CPU 200 and the buffer store memory 204 and the IOC 220 can each access a double word (8 bytes) of data in each memory reference. However, in a CPU memory access, either the four high-order bytes or the four low-order bytes are selected and only four bytes of information are received in the CPU 300.

Operations of the CPU are controlled by a read only memory ROM, herein called the control store unit 210. (Control store units for implementing the invention are found in a book entitled Microprogramming: Principles and Practices by Samir S. Husson and published in 1970 by Prentice Hall Inc. Other typical control store units are described in U.S. patent to Leonard L. Kreidermacher, having U.S. Pat. No. 3,634,883 issued Jan. 11, 1972, and assigned to Honeywell Inc.). Each location in the control store unit 210 can be interpreted as controlling one CPU cycle. As each location of control store is read, its contents are decoded by a micro-op decode function. Each micro-op decode function causes a specific operation within the CPU to take place. For example, control store data bits 1, 2, and 3 (not shown) being decoded as 010 could bring high a micro-op decode function that causes an A register (not shown) to a B register (not shown) transfer. Because each control store memory location may contain 30 to 50 bits, many micro-op decode functions can be brought high for each control store cycle.

By grouping locations, control store sequences are obtained that correspond to the execution of a specific CPU operation or instruction. As each instruction is initiated by the CPU 200, certain bits within the op-code are used to determine the control store starting sequence. Testing of certain flops (not shown) which are set or reset by a instruction decode functionality allows the control store unit to branch to a more specific sequence when necessary.

The control store interface adapter 209 communicates with the control store unit 210, the data management unit 206, the address control unit 207 and the arithmetic logic unit 212 for directing the operation of the control store unit 210. The control store interface adapter 209 includes logic for control store address modification, testing, error checking, and hardware address generation. Hardware address generation is utilized generally for developing the starting address of error sequences or for the initialization sequence.

The buffer store memory 204 is utilized to store the most frequently used or most recently used information that is being processed by the CPU 200. The buffer store memory is a relatively small, very high speed memory which contains 128 columns and 2 rows, referred to as the upper row and the lower row. It is logically divided into preset blocks which are uniquely addressable. These blocks are called pages and each page of memory contains 32 bytes of information. A particular page may be addressed by the most significant 16 bits of the main memory address, the least significant 5 bits being used to address a particular byte of information within the page. Pages may be transferred from main memory to buffer store memory with a column assignment maintained—i.e., a page from column one in main memory is always transferred into column one in the buffer store memory. However, whether the information is placed on the upper or lower row of the column depends on availability. Therefore, for each column of main memory pages (for instance for a system having 256K to 2 megabytes in main memory, there would be 64 to 512 pages), there are two pages in buffer store. For example, column 37 in main store may contain any two pages of information from column 37 in main memory. The two pages of information contained in the buffer store column at any given time depend on which pages have been most recently accessed by the CPU—i.e., the two most recently accessed pages typically reside in the buffer store memory 204.

Whether a given page of information is contained in buffer store 204 can be determined only by examining the contents of the buffer store directory 205. The buffer store directory is logically divided in the same manner as buffer store, however, instead of pages of information, each column in the buffer store directory 205 contains the main memory row address of the corresponding information in the buffer store 204. For example, if column 0 of buffer store 204 contains page 20 in the lower row and page 0 in the upper row, the buffer store directory contains 10100 and 00000 in the lower and upper row respectively. Thus, by accessing the buffer store directory 205 with the column number and comparing the requested row number with the row number contained in the buffer directory location, the CPU can determine whether a given page is contained in buffer store.

The data management unit 206 provides the data interface between the CPU 200 and main memory 201 and/or buffer store memory 204. During a memory read operation, information may be retrieved from main memory or buffer store memory. It is the responsibility of the data management unit 206 to strobe the information into the CPU registers at the proper time. The data management unit also performs masking during partial write operations.

The instruction fetch unit 208 which interfaces with the data management unit 206, the address control unit 207, the arithmetic and logic unit 212 and the control store unit 210 is responsible for keeping the CPU 200 supplied with instructions. The unit attempts to have the next instruction available in its registers before the completion of the present instruction. To provide this capability, the instruction fetch unit 208 contains a 12-word instruction register (not shown) that normally contains more than one instruction. In addition, the instruction fetch unit, under control of the control store 210, requests instructions from main memory 201 before the instruction is actually needed, thus keeping its 12-word instruction register constantly updated. Instructions are thus prefetched by means of normally unused memory cycles. The instruction fetch unit also decodes each instruction and informs the other units of the instruction's length and format.

The address control unit 207 communicates with the instruction fetch unit 208, the buffer store directory 205, the main store sequencer 202, the arithmetic logic unit 212, the data management unit 206, and the control store unit 210 via the control store interface adapter 209. The address control unit 207 is responsible for all address development in the CPU. All operations of the address control unit, including transfers to, from, and within the unit, are directed by control store micro-ops and logic in the unit. The normal cycling of the address control unit depends on the types of addresses in the instruction rather than on the type of the instruction. Depending on the address types, the address control unit may perform different operations for each address in an instruction.

The address control unit 207 also contains an associative memory that typically stores the base address of the eight most recently used memory segments, along with their segment numbers. Each time a memory request is made, the segment number is checked against the associative memory contents to determine if the base address of the segment has already been developed and stored. If the base address is contained in the associative memory, this address is used in the absolute address development, and a considerable amount of time is saved. If the base address is not contained in the associative memory, it is developed by accessing the main memory tables. However, after the base address of the segment is developed, it is stored in the associative memory, along with the segment number, for future reference.

Interfacing with the address control unit 207, the instruction fetch unit 208 and the control store unit 310 is the arithmetic logic unit 212 which is the primary work area of the CPU 200. The arithmetic logic unit's primary function is to perform the arithmetic operations and data manipulations required of the CPU. The operations of the arithmetic logic unit are completely dependent on control store micro-ops from the control store unit 210.

Associated with the arithmetic logic unit 212 and the control store unit 210 is the local store unit 211 which may be comprised of a 256-location (32 bits per location) solid state memory and the selection and read/write logic for the memory. The local store memory 211 is used to store CPU control and maintainability information. In addition, the local store memory 211 contains working locations which are primarily used for temporary storage of operands and partial results during data manipulation.

The central processing unit 200 typically contains eight base registers located in arithmetic logic unit 212 which are used in the process of address computation to define a segment number, an offset, and a ring number. The offset is a pointer within the segment and the ring number is used in the address validity calculation to determine access rights for a particular reference to a segment.

Figure 3:
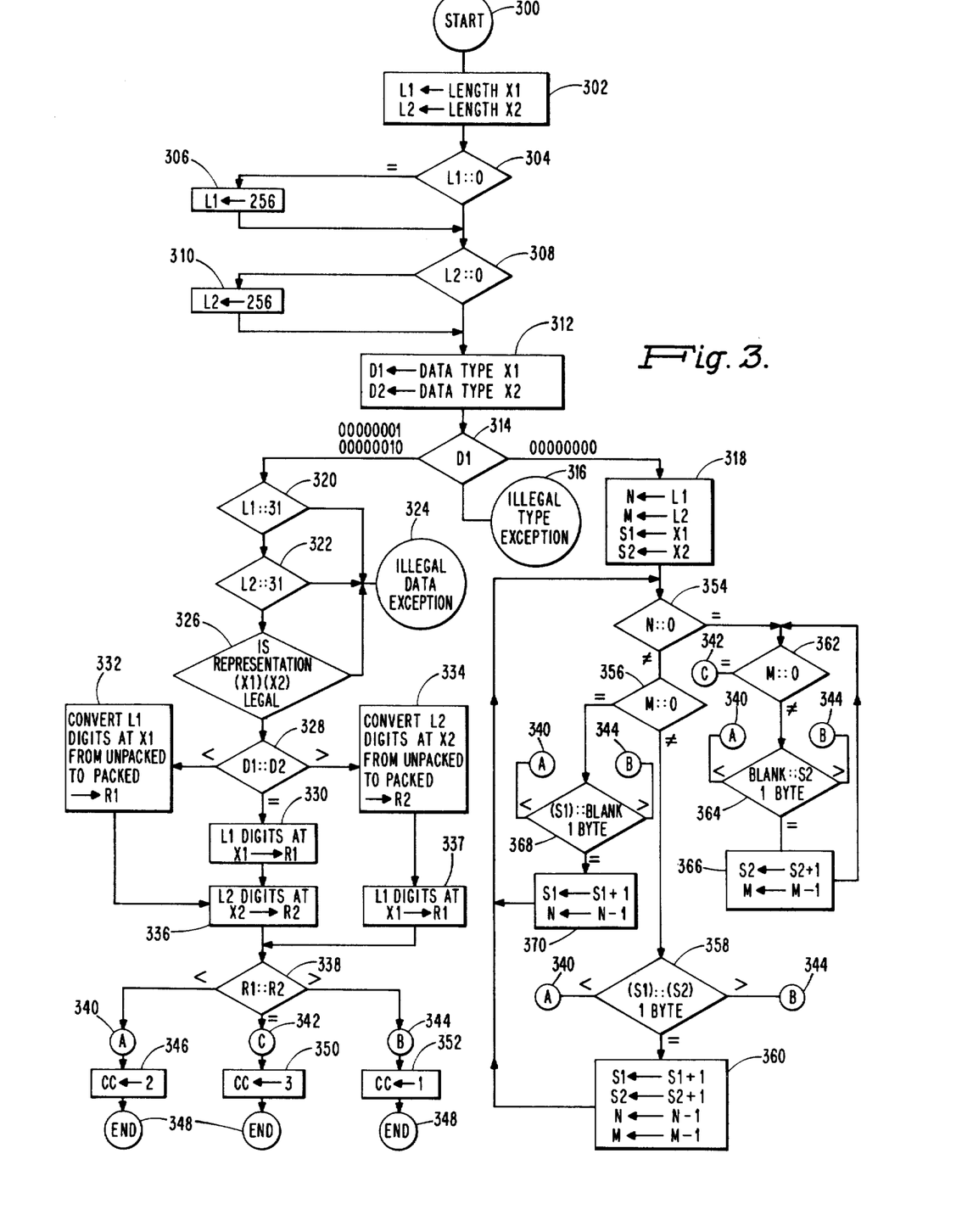
FIG. 3 is a schematic diagram of the compare instruction flow utilized in the present invention.

It should be noted that FIG. 3 is a detailed flow diagram of step 432 of the Charles Bachman patent application previously cited on page 9, and is one of the general purpose logical instructions which may be executed. As a result at this time, the instruction 100 shown in FIGS. 1a and 1b is stored in an instruction register 400 of the instruction fetch unit 208 shown in FIG. 4. The compare operation code has been detected by control store interface adapter 209 which in turn enables control store unit 210 to provide for a series of tests upon the data and data field descriptors of both data fields to be compared. These tests are generated by microinstructions from the control store unit 210. The results of these tests are detected by control store interface adapter 209 which, depending on the tested results, may modify the next microinstruction such that a related microinstruction incorporating the detected condition is generated.

The IOC 220 is the portion of the data processing system that completes a data path from a number of peripheral subsystems to main memory. It provides the path through which peripheral commands are initiated, and it controls the resulting data transfers. The IOC can handle a maximum of 16 channel control units, and each channel control unit can accommodate one peripheral control unit. It is these peripheral control units which provide to the central processing subsystem the user's data base files.

Figure 4:
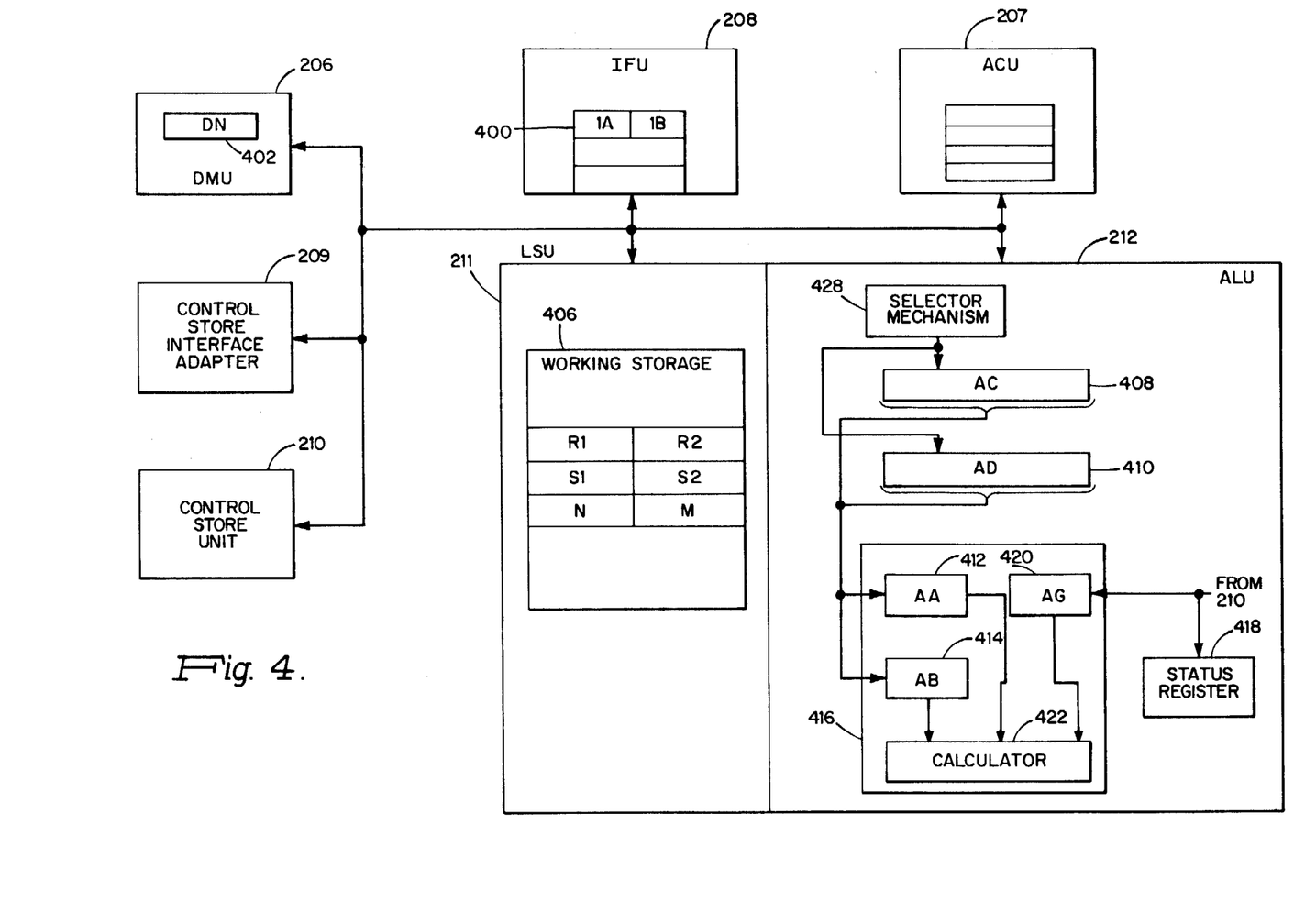
FIG. 4 is a logic block diagram of circuitry utilized in the data processing system of FIG. 2 and designed to carry out the compare instruction shown in FIG. 3 of the present invention.

Referring now to FIG. 3 there is shown a flow diagram of the compare instruction. FIG. 3, when read in conjunction with FIGS. 2 and 4, explains the overall operation of the system. FIG. 4 is a schematic diagram which shows the transfers and manipulations of the data by the compare instruction at the system level. When read in conjunction with FIG. 3 showing the flow chart, the operation and procedure incorporated in the compare instruction will be understood.

The interconnection of the control store unit 210 and the control store interface adapter 209 provides a microbranch technique wherein the signals received by the control store interface adapter are translated into a direct address in the control store unit 210. The operation resulting establishes a direct path for subsequent data transfers taking into account the previously detected conditions. This sequence of events occurs for each diamond illustrated in FIG. 3 and is not hereafter described in any detail. (For a further explanation of this operation, reference to the U.S. Pat. No. 3,634,883 issued to Leonard Kreidermacher, Jan. 11, 1972, and U.S. Pat. No. 3,560,993 issued to Scott Schwartz on Feb. 2, 1971, both assigned to the same assignee as this invention, should be made.)

Prior to start step 300, the instruction 100 is processed so as to provide the data field descriptor and the data field. While there are many alternative mehods for indirect address development (see, for example, U.S. Pat. No. 3,412,382 issued to Couleur et al on Nov. 19, 1968), a preferred method is as follows:

Each address syllable contains a predetermined bit field which identifies a base register located in arithmetic and logic unit 212. This base register contains a segment number and an offset. The segment number references a table which provides a descriptor locating the segment storing the data descriptor desired. To identify this data descriptor, the offset provided by the base register is added to the displacement field in the address syllable.

The data descriptor may contain up to three words as shown in FIG. 1c. This is initially determined by testing the tag field of word 102 which has now been fetched. If the tag field has a 01 encoding, it is known that there is at least one additional word, i.e., word 104. After fetching word 104, bits 36 to 38 are tested to determine if word 106 should also be fetched.

Word 102 is utilized to identify the location of the operand desired whereas words 104 and 106 identify the attributes of the operand located from word 102.

Word 102 is developed exactly as the address syllable, thus a base register is located, the base register having a segment number and an offset. After the segment number is referenced to a table to provide a segment descriptor locating the segment containing the operand, the offset in the base register is added to the displacement of word 102 thus identifying the exact location of the operand within the segment. All the computations described are performed in the arithmetic and logic unit 212 in a well known manner.

To summarize the development of the data field descriptors and the operand, the address syllable of the instruction in conjunction with a base register is used to locate the data field descriptors 102 to 106. Word 102 is then utilized in conjunction with another base register to locate the particular operand desired. Words 104 and 106 describe the attributes of the operand so located.

At start step 300 in FIG. 3, the attributes of the data field descriptors have been tested with the following results. The data types are legal and compatible; and the key fields are identical. The data field descriptors associated with the first and second operands are stored in registers 408 AC and 410 AD, respectively of arithmetic and logic unit 212 (shown in FIG. 4). (The actual mechanics providing the above features have been described in the copending application entitled, "Data Processing System Utilizing Data Field Descriptors for Processing Data Files", by Charles W. Bachman and assigned to the same assignee at this invention.)

At step 302 the length attribute of each of the data field descriptors is fetched. First, AC register 408 which contains word 104 of extended data descriptor shown in FIG. 1c. and associated with the first data field has its length descriptor selected by a selector mechanism 428. The selector mechanism transfers the length byte, i.e., bits 56–63 from the AC register to the AA register 412. The selector mechanism may select any byte contained within AC register or AD register. Alternatively, selection of the length byte may be accomplished by rotating the contents of the register to a predetermined location and the selecting of predetermined byte. The selector mechanism is not shown in detail since not only is it well known in the art, but also to describe it would unduly burden the description.

In step 304, the length descriptor is tested to determine whether or not it is zero. This is accomplished by subtracting via the AG register 420 a constant from the length attribute contained in register 412. The constant loaded under the control of control store unit 210 in register 420 is a binary ZERO. Since it is assumed that every data field has a length greater than zero, otherwise it would not exist, if a zero is obtained from the subtraction, the actual length is said to be 256 bytes long. In step 306 the length descriptor is changed if a zero is tested by the control store unit 210 and all binary ONES are transferred into AA register 412. In either situation, the contents of register 412 are then transferred to a register in working storage unit 406.

For step 308 the same test is performed on the length attribute of the second data field. Step 308 corresponds to step 304 except that the constant loaded in the AG register 420 is subtracted from the AB register 414 which has received the length field from AD register 410. The calculation is performed by calculator 422 and the results are stored in AB register 414 and then transferred to a register in working storage unit 406. At this time, the length for each of the data fields involved in the compare operation is known.

In step 312 a transfer of the data type of each data field descriptor from registers 408 and 410 to AA 412 and AB 414 registers, respectively, is executed. In step 314, the data type contained in AA register 412 is subtracted from a constant in the AG register 420. If the data type i.e., bits 41–48 is an alphanumeric string represented by a code 0000 0000, then a branch to step 318 is made. If the data type is a packed or unpacked decimal represented by a code 0000 0001 or 0000 0010, respectively, then a branch to step 320 is made. This branch results from the subtracted value provided by calculator 422. When a zero has been recognized, the control store unit 210 branches to the appropriate sequence of microinstructions to be hereinafter explained. If the data type is neither those of an alphanumeric string, unpacked decimal or packed decimal, an illegal data type exception as shown in step 316 occurs. This exception condition enables the control store unit 210 to indicate that the hardware in the data processing system 200 is not able to execute the instruction. However, it has been determined that 90% to 95% of all uses of a compare instruction are made on an alphanumeric string or a packed or unpacked decimal and hence the exception condition is not widely used.

For purposes of discussion, it is assumed that a packed or unpacked code has been determined as the first data type. Subsequent to this determination, a branch to step 320 occurs and the following steps are executed by control store memory 210 on the data fields and the data field descriptors. In step 320 the length operand of the first data field descriptor associated with the first data field is transferred to the AA register 412 via the selector mechanism 428. Since a decimal must be less than 32 digits, the length field is tested to see whether this condition exists. If upon subtraction of the length field from a constant contained in the AG register 420 a less than zero condition is realized, step 322 is executed. If the subtraction results in a positive number, than an illegal data exception condition as shown in step 324 is executed. This would be an exception routine provided by the control store unit 210 which would indicate that data is not within the limits set up by the operating system. In step 322 the same test as performed in step 320 is executed; this time, however, the second data field is tested.

In step 326, a determination of whether a legal representation for the contents of the first and second operands is made. An illegal representation would be an integer representation having a four bit encoding greater than 1001, i.e., the four bit binary number as encoded must not have a value greater than that which corresponds to a decimal 9. If the determination step 314 indicated that an unpacked decimal was being sensed, then a test for the sign would also be made for determining a legal representation. An unpacked decimal number is a series of contiguous bytes in main storage containing a sign and magnitude representation of a decimal integer. Each byte contains a four bit digit encoding and a four bit zone encoding except the rightmost byte which contains the digit encoding and a sign (positive or negative) encoding. Four bit digit encodings are illegal if they face between 1010 and 1111 (i.e., a binary representation corresponding to a decimal number 10 to 15). Step 326 examines the encodings of an unpacked decimal. The encoding 1111 is delivered to all zones. The sign encoding which is the first four bits of the last byte is the same as the sign encodings for the packed decimal. The representation of an unpacked decimal number is illegal if either a digit encoding or a sign encoding is illegal. Thus, each byte of the first operand is fetched to make sure the information it contains is legal.

For a packed decimal number, the same legal representations are tested. A packed decimal number is a series of contiguous bytes in main storage containing a sign and magnitude representation of a decimal integer. Each byte contains two four bit digits (i.e., number) encodings except for the rightmost byte which contains a four bit digit encoding and a four bit sign encoding. The leftmost digit is the high order digit. The format of a packed decimal number is such that the encodings of 1010 to 1111 are legal. The sign encodings are interpreted such that the sign encodings of 1010, 1100, 1110, 1111 are positive signs and the sign encodings 1011 and 1101 are negative sign encodings. Since the sign occurs as the last four bit digit of the packed decimal, if an encoding 0000 through 1001 is detected, an illegal sign encoding is determined.

In step 328, a testing of the data type of the first data field and the data type of the second data field is made. This is accomplished by subtracting the data types stored in AA register 412 and the data types stored in the AB register 414 by calculator 422. If a zero results, step 330 is executed. If a negative number is sensed, then step 332 is executed whereas if a positive number is determined, then step 334 is executed.

For the equal condition, it is known that both data types are either packed or unpacked decimals. The comparison is then executed with right justified sign operands. If the lengths are not equal, the shorter operand is extended to the left with zeros. The comparison of unpacked operands is performed ignoring all zones except the operand's sign. This is shown in steps 330 and 336 wherein the data field associated with the first operand is transferred to a temporary storage register R1 in the data field while the second data field is transferred to a temporary storage register R2. A comparison is then made in step 338 with the results being less than, greater than or equal to as shown in steps 340, 342 and 344, respectively.

If the testing in step 328 indicated that the first data type was less than the second data type, it is known that the first data type is an unpacked decimal and the second data type is a packed decimal. As a result of this, step 332 converts the first data field from an unpacked decimal to a packed decimal and stores this result in a temporary storage register R1. Since the second data field contains a packed representation, step 336 is executed wherein the packed decimal is stored in a second temporary register R2. A comparison of the packed decimals with the right justified sign operand is that executed in step 338.

If in step 328 the second operand was larger than the first operand, it is known that the second operand is an unpacked decimal and the first operand is a packed decimal. As was the case in step 332, the unpacked decimal is converted to a packed decimal. However, in this instance, the unpacked decimal is the second operand. This is converted to packed decimal form as shown in step 334. The first operand which is a packed decimal is then transferred to a temporary storage register R1 in step 337 and the comparison shown in step 338 is executed. The translation from an unpacked decimal to a packed decimal is accomplished by taking the digit representation and eliminating the zone of the unpacked byte. For the last byte in the unpacked decimal, the four bit digit number and the sign number would be interchanged thus allowing a correspondence of information.

The actual implementation of the transfer from unpacked decimal to packed decimal can be accomplished by simply truncating the zone bits in the unpacked decimal. The remainder would then be four bit digit (i.e., number) encoding which would then be stored in the temporary storage register R1. Alternatively, a constant may be loaded in the AG register 420 with the calculator 422 set to subtraction. The lower four bits resulting from the subtraction would then be stored in the temporary storage register.

If the comparison operation as shown in step 338 results in the first data field being less than a second data field, then a status register 418 would be set to a condition code of 2. This would indicate that the first data field is less than the second data field. Thus, step 346 would be the transferral to the status register 418 by the control store unit 210 of the condition code 2. If the first data field was equal to the second data field, then a condition code of 3 would be set in the status register 418 indicating that they were equal. This is shown as step 350. If the second data field was larger than the first data field, then the status register 418 is set to a condition code of 1 as shown in step 352 which indicates a more positive number in the second data field. At the end of setting the status register, the next instruction would be executed.

If in step 314 it was determined from the data type that an alphanumeric string were present, a branch to step 318 by control store unit 210 would occur. In step 318 four temporary registers are set up. A first temporary register, hereinafter referred to as N, stores the minimum length of the first data field shown as L1. A second temporary storage register, hereinafter referred to as M, is set up so that the minimum length of the second data field is stored. The actual data field content is then transferred from locations X1 and X2 to temporary storage registers S1 and S2. The actual byte as shown by parenthesis, i.e., (S1) and (S2), are compared from left to right, one byte at a time. The content of each byte is considered an 8 bit positive integer. The comparison is determined when two bytes are unequal or when both strings are exhausted. If the length of the data fields are unequal, the shorter operand is extended to the right with blank characters as will be subsequently seen from a description of steps 354 and 356.

In steps 354, a test for the first operand length is made. If the first operand is not zero, which is the usual situation, step 356 is executed. In step 356, the second operand length is tested for a zero. As will be the usual situation, the second data field will not initially contain a zero length. Thus, step 358 is executed.

In step 358, the content of the first two bytes as indicated by (S1) and (S2) are compared. If as a result of the comparison of the first byte, an unequal condition exists, then a branch to step 340 or 344 occurs. This would set up the status register 418 with the condition code that would indicate a less than or greater than result from the comparison operation. The comparison in step 358 is identical to the comparison made in step 338 via the calculator unit 416.

If an equal condition exists, then the next byte must be considered. This condition is set up by step 360 which sets the various temporary storage registers to the next byte. More specifically, the actual data fields as contained in temporary storage registers S1 and S2 are incremented by one since they will now point to the next byte in the data fields. The length attributes as contained in the N and M temporary storage registers are decremented by one. Each of these operations on S1, S2, N and M may be performed by loading a constant in the AG register and setting the calculator 422 to either addition or subtraction. The AA and AB registers are used to store the various information from the temporary storage registers and return the result after the arithmetical operation to the temporary storage registers. Subsequent to step 360, step 354 which involves the testing of the first data field length, would then be reexecuted.

If the first operand length were tested to be zero, then step 362 would occur. This step tests the second operand length to determine if it is a zero. If so, the status register 418 is set to a binary 3 indicating that the first data field of the alphanumeric string is equal to the second data field of the alphanumeric string. If, however, the second data field is unequal to zero, then the second data field is compared to a blank which is provided for the first data field. Thus, step 364 involves the generation of a blank field in order to perform the comparison. If either a greater than or less than condition is sensed upon testing the second data field to the blank byte, the branching to either the greater than (step 340) or less than (step 344) condition code in the status register is executed. If, however, an equal condition exists, i.e., the second data field also contains a zero value, then step 366 is executed. In step 366 the next byte in the second data field as stored in temporary storage register S2 is incremented such that the new contents are provided. Also, the temporary storage register M storing the length of the second data field is decremented by 1. The loop involving steps 362 and 364 are then reexecuted until all the bytes in the second data field are tested.

If the first data field length as shown by the contents of the N temporary storage register is greater than zero and the second data field length as shown by the M temporary storage register is equal to zero, then a branch at step 356 to step 368 would occur. Step 368 indicates that a blank byte is added to the second data field since the first data field is longer. This blank byte is accomplished such that a comparison of the two fields to determine whether or not they are equal is provided. In step 368, if the first data field byte is unequal to the second data field byte, a branch to the less than (step 340) or greater than (step 344) condition code would result. If they are equal, however, then step 370 would be executed. In step 370, the temporary storage registers storing the address of the first operand would be incremented such that the next successive byte of the first data field would be accessed. Also, the length indication of the first data field as shown by the N temporary storage register would be decremented, and step 354 would be reexecuted.

If the entire first data field was comparable to the second data field, irrespective of the length of each of the data fields, then step 362 would finally be accessed indicating that an equal condition exists. Subsequently, the next instruction in the data processing system 200 would be executed.

If the key fields of the data descriptors were unequal as would be the situation wherein grams were to be compared to pounds, a routine would enable one of the data fields having one of the quantities to be reformatted to the other quantity. The above steps would then be executed taking into account the data formats and lengths of each data field. By recognizing the different key fields, data processing time and storage space is minimized.

Although it has been shown, described and pointed out, the fundamental novel features of the invention applied to the preferred embodiment, it is understood that various omissions, substitutions and changes in the form and detail of the device illustrated in this operation may be made by those skilled in the art without departing from the spirit of the invention. Thus, the steps may be altered and/or minor variations of them incorporated without departing from the scope of the invention. It is the intention, therefore, to be limited only as indicated by the scope of the following claims.

I claim:

1. An apparatus for comparing data fields having a plurality of different data structures, said apparatus comprising:
    memory means for storing signals which represent a compare instruction, said signals including a first, second, and third group;
    first means responsive to said first group for providing a first data field descriptor associated with a first data field, said first data field descriptor describing at least the data type and length of said first data field;
    second means responsive to said second group for providing a second data field descriptor associated with a second data field, said second data field descriptor describing at least the data type and length of said second data field;
    third means coupled to said first and said second means and responsive to said third group for comparing said first data field to said second data field, said third means including:
    fourth means responsive to said first means for determining the data type of said first data field;
    fifth means responsive to said second and said fourth means for comparing the data types of said first and second said data fields and for providing an indicating signal when they are different;
    sixth means responsive to said indicating signal for reformatting the data types of said first and said second data fields such that they are the same data type;
    seventh means responsive to said fifth and said sixth means for comparing said data fields and providing an output signal which indicates the relationship between said data fields.

2. An apparatus as defined in claim 1 wherein the data type of said first and second data fields is categorized as belonging to one of the following categories:
    a. alphanumeric string,
    b. decimal, packed or unpacked, and
    c. other.

3. An apparatus as defined in claim 2 wherein said sixth means reformats said data fields from an unpacked decimal type to a packed decimal type.

4. An apparatus as defined in claim 1 and further including:
    eighth means responsive to said first and second means for testing whether the lengths of said first and said second data fields are allowable, said eighth means providing an enabling signal to said third means only if said lengths are allowable.

5. An apparatus as defined in claim 1 wherein said first data field descriptor also includes a key field descriptor and said second data field descriptor also includes a key field descriptor, each key field descriptor indicating the dimensionality of said respective data field.

6. An apparatus as defined in claim 1 and further including:
    ninth means responsive to said seventh means for providing a condition code signal indicative of whether said first data field is lesser than, greater than or equal to said second data field.

7. An apparatus for comparing a first data field having a first embodiment to a second data field having a second embodiment, said apparatus comprising:
    first means for describing the location and attributes of said first data field having said first embodiment,
    second means for describing the location and attributes of said second data field having said second embodiment, and
    third means for comparing said first data field with said second data field, said third means including:
    fourth means responsive to said first and second means for determining attributes of said first and second embodiments,
    fifth means responsive to said fourth means for testing whether the attributes of said first and said second data fields are the same,
    sixth means responsive to said fifth means when said attributes are not the same for reformatting said data fields so that said attributes are the same,
    seventh means responsive to said fifth and said sixth means for comparing said data fields when said attributes are the same.

8. An apparatus as defined in claim 7 wherein attributes of said first and second embodiment include data type, key and length descriptors.

9. An apparatus as defined in claim 8 and further including a plurality of registers and
    wherein said fourth and said fifth means determine the data type of said first and second data fields to be alphanumeric strings, said seventh means in response to said data fields being an alphanumeric string transfers to a first of said plurality of registers the length description of said first data field and to a second of said plurality of registers the length description of said second data field.

10. An apparatus as defined in claim 9 wherein said seventh means compares said first data field and said second data field on a byte by byte basis, said seventh means adding a number of blank characters to said data fields when either said first or said second register indicates that no further bytes of said data field are present in said alphanumeric string and the other register indicates that additional bytes in said other data field are present.

11. An apparatus as defined in claim 8 wherein said fourth and fifth means determine the data type of said first and second data fields to be either a packed decimal or an unpacked decimal.

12. The apparatus as defined in claim 11 wherein said sixth means in response to different data types in said first and second data fields reformats at execution time said data field having the unpacked decimal format to a packed decimal format so that said seventh means compares said first data field to said second data field both being in said packed decimal format.

13. The apparatus as defined in claim 7 wherein said seventh means generates a condition code signal indicating that said first data field is less than, greater than or equal to said second data field.

* * * * *